Figure 3:
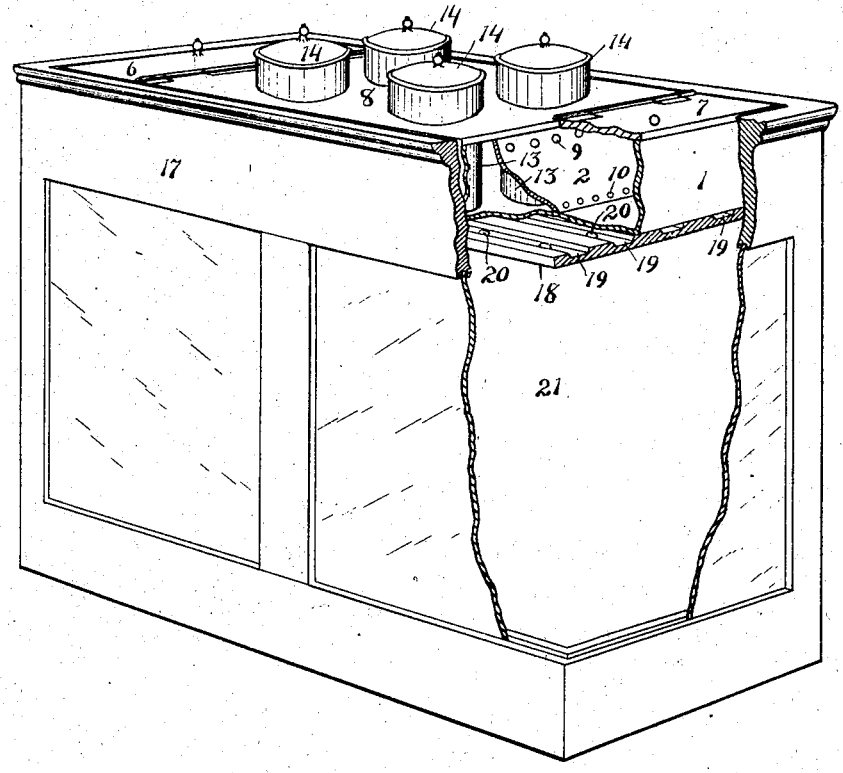

No. 791,738. PATENTED JUNE 6, 1905.
J. B. WHITE.
REFRIGERATOR.
APPLICATION FILED JUNE 30, 1903.
2 SHEETS—SHEET 1.
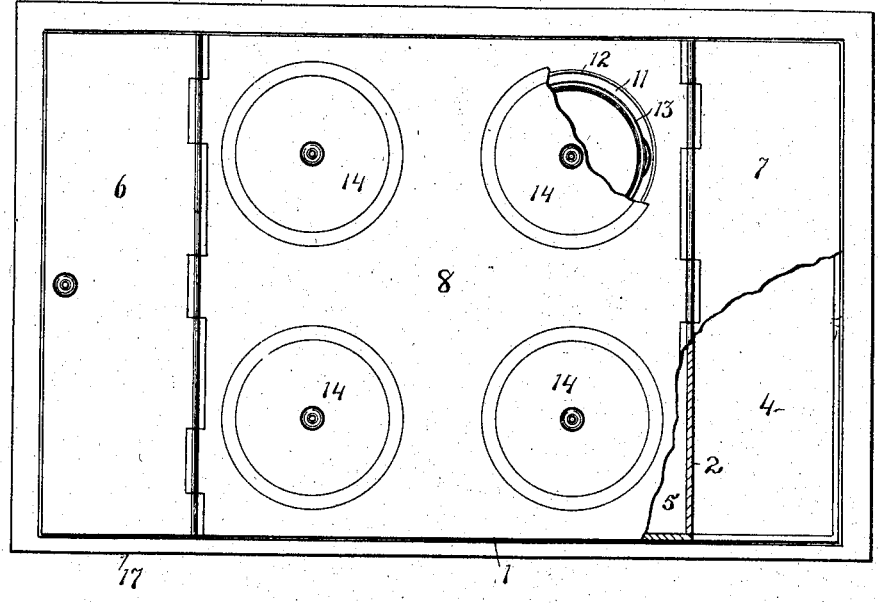
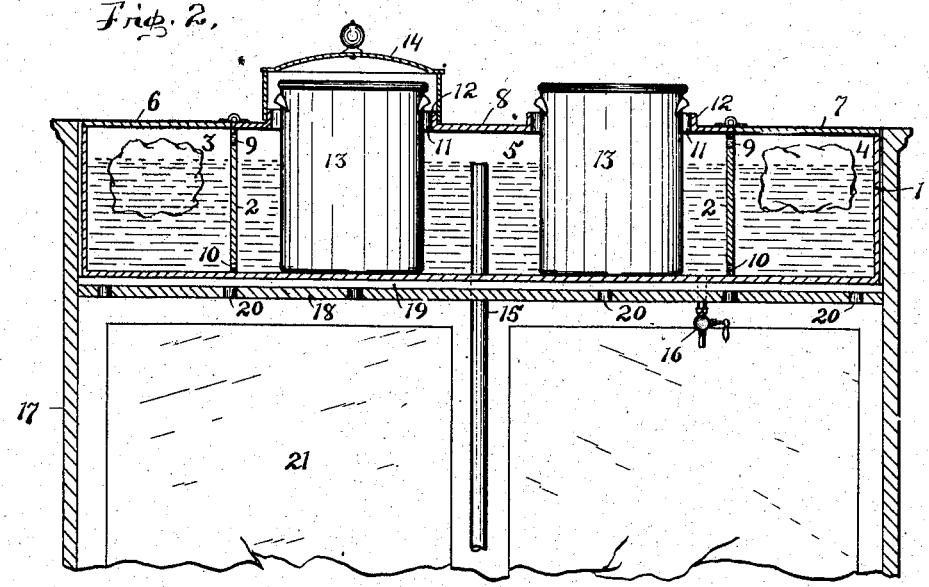

No. 791,738. PATENTED JUNE 6, 1905.
J. B. WHITE.
REFRIGERATOR.
APPLICATION FILED JUNE 30, 1903.

2 SHEETS—SHEET 2.

WITNESSES:
E. H. Pope.
S. Luhmann.

James B. White INVENTOR
BY W. J. Burns
ATTORNEY

No. 791,738. Patented June 6, 1905.

UNITED STATES PATENT OFFICE.

JAMES B. WHITE, OF FORT WAYNE, INDIANA.

REFRIGERATOR.

SPECIFICATION forming part of Letters Patent No. 791,738, dated June 6, 1905.

Application filed June 30, 1903. Serial No. 163,730.

*To all whom it may concern:*

Be it known that I, JAMES B. WHITE, a citizen of the United States, residing at Fort Wayne, in the county of Allen and State of Indiana, have invented certain new and useful Improvements in Refrigerators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in refrigerators in which a number of articles of merchandise are stored in common; and the object thereof is to so construct the refrigerator that any one of said articles will be accessible without exposing the other articles or the vessels containing the same contained in the refrigerator.

I accomplish my object by the construction illustrated in the accompanying drawings, in which—

Figure 1 is a plan of the refrigerator, partly cut away. Fig. 2 is a partial longitudinal vertical section of the same; and Fig. 3 is a perspective view, partly cut away, to show the interior.

Similar numerals of reference indicate corresponding parts throughout the several views, and referring now to the same, 1 is a tank capable of holding a quantity of water, and 2 2 are vertical partitions arranged therein which divide said tank into the compartments, so as to form a central cooling-chamber 5 and ice-chambers 3 and 4 upon either side of said cooling-chamber. Hinged lids 6 7 are arranged over the ice-chambers 3 and 4, respectively, and the cooling-chamber 5 is covered by the top 8 of the tank. A horizontal series of holes 9 is made in each partition near their tops for the passage of air, and a similar series of holes 10 is made along the lower part of each partition for the passage of water. In the top 8 are made a number of openings 11 11, which communicate with the cooling-chamber 5, and collars 12 are attached upon the top around said openings, respectively. Removable vessels 13 are placed in the cooling-chamber 5 through the openings 11. The said vessels, such as crocks, are preferably of a size suited to approximately fit loosely within the collars 12 and extend to the tops thereof. Covers 14 are made to fit over the collars 12 and close the openings 11, the flanges of the said covers being sufficiently deep so that the covers will extend over the tops of the vessels. An overflow-pipe 15 leads from within the cooling-chamber 5 at a point just beneath the level of the air-holes 9 in said partitions, and a drain-tap 16, having a communication with said tank, serves to draw off the water contained therein.

The tank 1 is mounted in a case 17, the top of the tank ranging flush with the upper edges of the sides of said case and the bottom of the tank resting upon a platform 18, supported in the upper part of said case. In the top of said platform is made a series of grooves 19, and a number of apertures 20 extend from the bottoms of said grooves through said platform and afford passages for air from said grooves into the chamber 21 of said case.

In using my invention quantities of ice are placed in the compartments 3 and 4, and the tank is filled with water. As the ice melts the consequent water passes from said compartments through the holes 10 and is discharged through the overflow-pipe. In thus passing the water circulates about the vessels submerged therein, and the air also circulates likewise. Thus the vessels are kept at a temperature corresponding to that of the water and air contained in the cooling-chamber 5.

It will be understood that access may be had to the vessels 13 severally by removing the corresponding covers and that when one of the covers is removed the compartments are not exposed to the exterior air, and hence the temperature of the air and water in the compartments is not raised nor the air therein disturbed, as would be the case if the entire top of the tank were raised like the lid of an ordinary ice-box. The contents of the other vessels are not exposed when only one of the covers is removed. The utility of this arrangement is more apparent when the device is used by a vender who has frequent occasion to gain access to the various vessels.

The compartment 21 may be used for storing purposes for articles of perishable nature, the air therein being kept cool because of radiation from the bottom of the tank and the communication afforded by the grooves and apertures described.

Having set forth my invention, what I claim as new, and desire to secure by Letters Patent, is—

In a refrigerator, a tank having ice-chambers in the ends thereof and a cooling-chamber intervening the ice-chambers; means of communication at the upper and lower parts of the ice-chamber with the cooling-chamber; openings in the top of said tank communicating with the cooling-chamber, the said openings having adjacent collars; containing vessels in the cooling-chamber seated upon and supported by the bottom thereof, the vessels being arranged one at each of said openings in the top of the tank and extending above said collars; and removable covers to close said openings over said collars and vessels, and each resting upon and being supported by the top of said tank when the former are in place.

In testimony whereof I affix my signature in presence of two witnesses.

JAMES B. WHITE.

Witnesses:
 EDWARD WHITE,
 WM. H. F. AUMANN.